(12) United States Patent
Vasquez et al.

(10) Patent No.: US 6,947,439 B2
(45) Date of Patent: Sep. 20, 2005

(54) ETHERNET CROSS POINT SWITCH WITH REDUCED CONNECTIONS BY USING DUAL CONTROL TO THE CROSS POINTS IN THE SWITCH

(75) Inventors: Silverio C. Vasquez, Westminster, CO (US); Jaan Raamot, Broomfield, CO (US)

(73) Assignee: Lucent Technologies Inc., Murray Hill, NJ (US)

(*) Notice: Subject to any disclaimer, the term of this patent is extended or adjusted under 35 U.S.C. 154(b) by 901 days.

(21) Appl. No.: 09/747,911

(22) Filed: Dec. 22, 2000

(65) Prior Publication Data

US 2002/0080815 A1 Jun. 27, 2002

(51) Int. Cl.$^7$ ............................................. H04L 12/56
(52) U.S. Cl. ........................ 370/427; 370/369; 370/380
(58) Field of Search ............................. 370/357, 360, 370/369, 370, 371, 372, 373, 374, 380, 381, 384, 385, 386, 387, 388, 445, 447, 448, 427

(56) References Cited

U.S. PATENT DOCUMENTS

| 5,345,447 A | * | 9/1994 | Noel | 370/362 |
|---|---|---|---|---|
| 5,467,347 A | * | 11/1995 | Petersen | 370/230 |
| 5,475,383 A | * | 12/1995 | Ohta et al. | 370/382 |
| 5,621,893 A | * | 4/1997 | Joh | 709/249 |
| 5,682,383 A | * | 10/1997 | Dahod et al. | 370/364 |
| 5,784,003 A | * | 7/1998 | Dahlgren | 340/2.2 |
| 6,026,095 A | * | 2/2000 | Sherer et al. | 370/448 |
| 6,601,085 B1 | * | 7/2003 | Wertheimer et al. | 709/200 |

* cited by examiner

Primary Examiner—Bob A. Phunkulh

(57) ABSTRACT

One embodiment of the present invention is an arrangement for establishing connectivity between the inputs and outputs of n ports in a switching system includes first and second matrices of cross points and a control circuit. The first matrix includes n×n cross points, each first matrix cross point establishing a unilateral path between two of the n ports. The second matrix includes n×n cross points, each second matrix cross point establishing a unilateral path between two of the n ports. The control circuit is associated with a first cross point of the first matrix and a complementary cross point of the second matrix, the first cross point operable to establish a unilateral path from a source port (i) to the destination port (j), the complementary cross point operable to establish a unilateral path from the destination port (j) to the source port (i).

20 Claims, 8 Drawing Sheets

ETHERNET CROSS POINT SWITCH WITH REDUCED CONNECTIONS BY USING DUAL CONTROL TO THE CROSS POINTS IN THE SWITCH

CROSS REFERENCE TO RELATED APPLICATIONS

Cross reference is made to our U.S. patent application Ser. No. 09/748,565, now U.S. Pat. No. 6,691,202 B2.

FIELD OF THE INVENTION

The present invention relates generally to a system and method for providing connectivity between networks, and more particularly, to a system and method for providing connectivity with collision detection in large-scale networks.

BACKGROUND OF THE INVENTION

Data networks, in general, use multiple layers of communication protocols to effectuate data communication between entities on the network. The lowest layer of the communication is often referred to as the physical layer. The second layer is often referred to as the packet layer. Communication standards that include such multiple layer connectivity include that defined in the ISO 8802/3IEEE 802.3 specification for 10Base-T local area networks.

In accordance with such communication schemes, lower layers are generally employed for local switching between the network entities connected to a single hub. In general, physical layer switches are geographically limited in part because of the methodologies employed to detect whether connectivity is available. According to the ISO standard, an source entity determines physical layer connectivity by sending a packet to the hub, the packet being intended for a destination entity. When the hub receives a transmit packet, it repeats the packet to all entities that are connected to the hub. If another network entity has transmitted a packet to the hub before the packet from the source hub is completely received by the hub, the source entity detects a collision and then determines that the transmission is unsuccessful. If however, no collision is detected, the hub provides the connection to the destination entity and passes the transmitted packet directly through.

Packet layer switching, which typically occurs between hubs of a larger network, includes the step of sending one or more packets to a packet switch from a source entity. The packet switch then stores one or more packets and transmits the packets when connectivity to the destination entity or another intermediate switch is available. By contrast, in physical layer switching, as discussed above, the collision is made in real-time as the source entity packet is being transmitted.

Accordingly, physical layer switching allows for faster communication than packet layer switching because physical layer switching does not involve the storage of packets in the intermediate switch. However, packet layer switching is usually employed to establish connectivity between multiple local area networks. Thus, communication between entities on multiple local area networks is relatively slow as compared to communication between entities on the same local area network.

A switching system has been proposed, however, that allows multiple LANs to be connected at the physical layer, thus providing increased communication speed. The switching system is described in U.S. patent application Ser. No. 09/203,016, filed Nov. 30, 1998, which is assigned to the assignee of the present invention and incorporated herein by reference. The system includes a space switching unit and a plurality of switch interface units coupled between the space switching unit and a plurality of LANs. When a LAN provides a transmit packet to its switch interface unit, the switch interface unit establishes a first unilateral path from the destination entity to the space interface unit that is coupled to the source entity. If the space interface unit detects activity on the first unilateral path, the space interface unit provides a collision indication to the source entity before the source entity has finished transmitting the transmit packet. Because the collision is provided before the source has finished transmitting the packet, the source entity logs a collision as it would in any LAN collision.

If, however, the switch interface unit detects no activity on the first unilateral path, the switch interface unit establishes a second unilateral path from the source entity to the destination entity to allow communications. A first-in-first-out buffer or the like delays the transmit packet a sufficient amount of time to allow the collision determination to be made.

Thus, the entire connection operation described in the U.S. patent application Ser. No. 09/203,016 is provided within the standard communication requirements of a physical layer switching operation. As a result, connectivity between multiple entities on multiple LANs may be accomplished relatively quickly.

While the forgoing switching system can increase transmission speed between LANs, it is limited by the practical number of connections that the space switching unit may make. The space switching unit typically is an integrated circuit that allows each of m inputs to be connected to each of m outputs. Currently, such a device allows for first and second unilateral connections (i.e. transmit and receive links) between 128 entities. Each of the links is independently addressed through corresponding m single input address lines. Although such a device may be expanded to provide 256 or more connections, the number of connections remains limited to the capacity of the space switching unit.

Consequently, there is a potential need for expand physical layer switching capacities in a switching system between multiple LANs (or other sub-networks).

SUMMARY OF THE INVENTION

The present invention fulfills the above needs, as well as others, by providing a cross point arrangement having a single control circuit for both forward path and return path cross points. The forward path and reverse path cross points may form complementary cross point matrices. As a result, a single control circuit can cause the return path cross point to connect the destination hub to the source port to allow the source port to monitor the destination hub to determine if the destination hub is idle, and cause the forward path cross point to connect the source port to the destination hub if the destination hub is determined to be idle. The use of a single control circuit to control both cross points greatly simplifies control of the cross points to establish a physical layer connection between hubs of different local area networks. Because the control is simplified, less circuitry is required and the practical number of hubs that may be connected through the matrix is increased.

One embodiment of the present invention is an arrangement for establishing connectivity between the inputs and outputs of n ports in a switching system includes first and second matrices of cross points and a control circuit. The first matrix includes n×n cross points, each first matrix cross point establishing a unilateral path between two of the n ports. The second matrix includes n×n cross points, each second matrix cross point establishing a unilateral path between two of the n ports. The control circuit is associated with a first cross point of the first matrix and a complementary cross point of the second matrix, the first cross point operable to establish a unilateral path from a source port (i) to the destination port (j), the complementary cross point operable to establish a unilateral path from the destination port (j) to the source port (i).

The above-described features and advantages, as well as others, will become more readily apparent to those of ordinary skill in the art by reference to the following detailed description and accompanying drawings.

DETAILED DESCRIPTION

Figure 1:
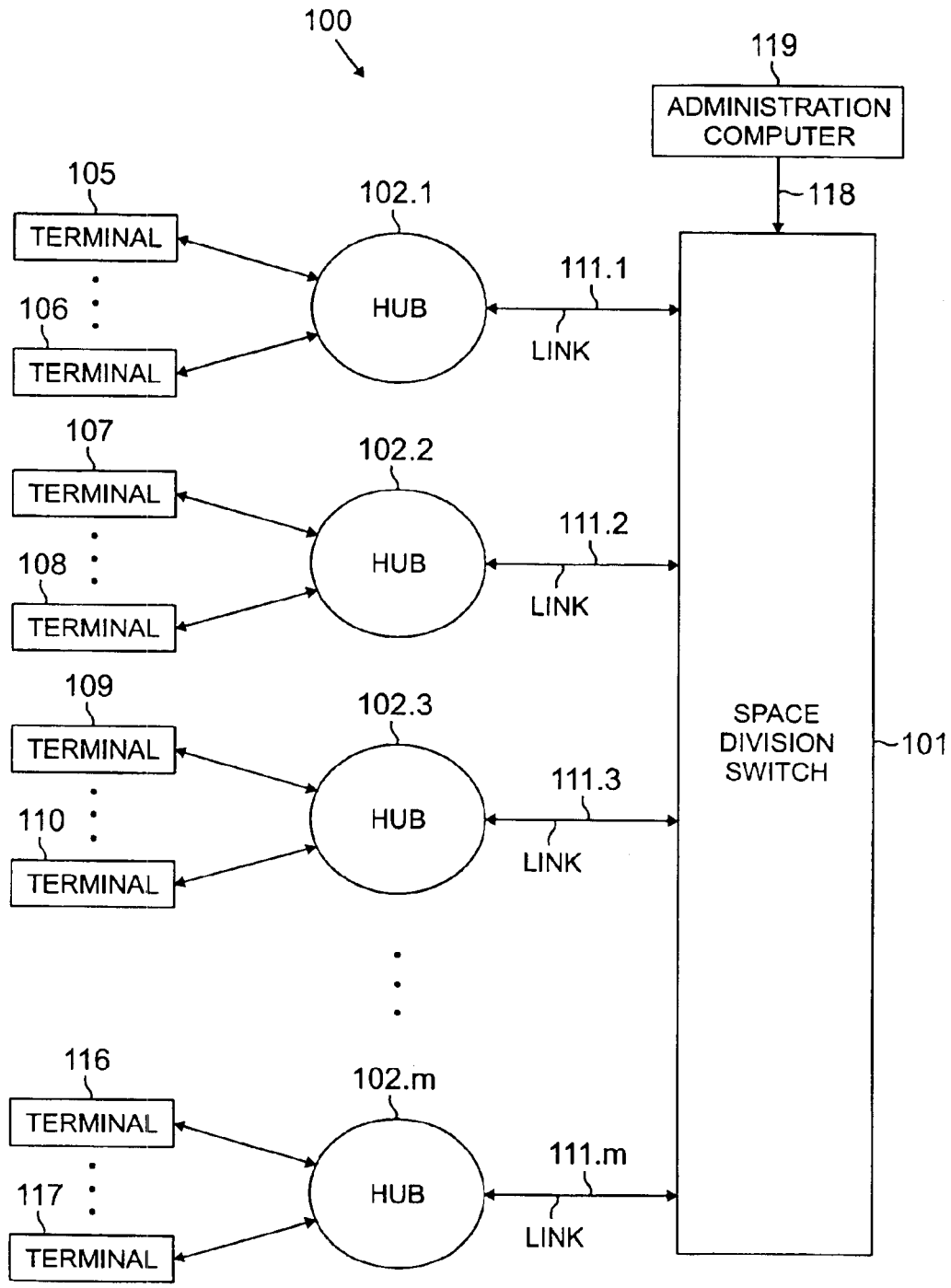
FIG. 1 shows an exemplary Ethernet switching system, in accordance with the present invention.

Referring to FIG. 1, there is shown an exemplary Ethernet switching system 100, in accordance with the present invention. The Ethernet switching system 100 includes a space division switch 101, a plurality of Hubs 102.1, 102.2, 102.3, ..., and 102.n, a plurality of terminals 105–110, 116 and 117, and an administration computer 119. Each of the Hubs 102.1, 102.2, 102.3, ..., or 102.n is coupled to the space division switch 101 via a respective link 111.1, 111.2, 112.3, ..., or 111.n. Each of the terminals is coupled to one of the Hubs.

Each of the Hubs 102.1, 102.2, 102.3, ..., or 102.n is capable of functioning as a stand alone unit. For example, if the terminal 105 wishes to transmit a packet as illustrated in FIG. 3 to the terminal 106, this communication is done solely within the Hub 102.1. Each of the links 111.1, 111.2, 111.3, ..., or 111.n comprises a transmit sublink and receive sublink as will be illustrated in greater detail in FIG. 2.

Figure 3:
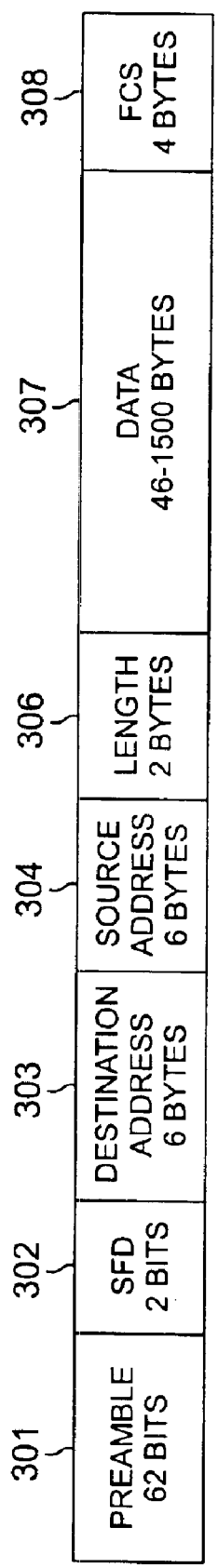
FIG. 3 shows an exemplary protocol of an Ethernet packet.
Figure 4:
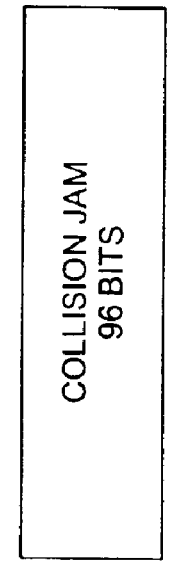
FIG. 4 shows an exemplary protocol of a collision jam packet.

In the example in which the terminal 105 transmits a packet to the terminal 106, if a collision occurs in the transmission process, then a jam signal as illustrated in FIG. 4 is transmitted to ensure that all terminals coupled to the Hub 102.1 recognize that a collision has occurred. For example, if the terminal 105 was attempting to transmit a packet to the terminal 106 and another terminal was transmitting a packet at the same time on the Hub 102.1, then the terminal 105 detects a violation of the packet protocol (illustrated in FIG. 3). Upon detecting the violation (or collision), the terminal 105 generates a jam signal as illustrated in FIG. 4 and attempts to transmit the packet at a later point in time to the terminal 106. During the transmission of a packet from the terminal 105 to the terminal 106, no connection is made from the Hub 102.1 to any other Hubs through the space division switch 101.

If the terminal 105 wishes to transmit a packet to the terminal 109, which is coupled to the Hub 102.3, the terminal 105 transmits the packet to the Hub 102.1. In general, the space division switch 101 monitors the link 111.1 for destination addresses in packets that do not correspond to a terminal coupled to the Hub 102.1. When the space division switch 101 recognizes the destination address as designating the terminal 109, the space division switch 101 monitors for the activity on the Hub 102.3. If a packet is presently being transmitted on the Hub 102.3, then the space division switch 101 does not allow the transmission of the packet from the terminal 105 to the terminal 109. In such a case, the space division switch 101 signals collision to the terminal 105.

In particular, the space division switch 101, upon recognizing the destination address as being that of the terminal 109, establishes a unilateral path from the Hub 102.3 to the Hub 102.1 via the link 111.3 and the link 111.1. Because another terminal is transmitting a packet on the Hub 102.3 and this packet is also being transmitted via the unilateral path, the space division switch 101 provides a collision signal to the terminal 105 via the Hub 102.1. The transmission of the packet on the Hub 102.3 is not interfered with since no transmission path was setup from the Hub 102.1 to the Hub 102.3.

To further the previous example, assume that the terminals 105 and 107 simultaneously attempt to transmit a packet to the terminal 109. The space division switch 101 establishes a first unilateral path from the Hub 102.3 to the Hub 102.1 and a second unilateral path from the Hub 102.3 to the Hub 102.2. If it is also assumed that the terminal 110 is transmitting a packet on the Hub 102.3, then the space division switch 101 does not allow the Hubs 102.1 and 102.2 to transmit the packets from their respective transmitting terminals to the Hub 102.3. The terminals 105 and 107 will both detect collision signals generated by the space division switch 101 and attempt to transmit at a later point in time.

Assume, however, that the terminal 110 was not transmitting a packet, and the Hub 102.3 was idle when the terminals 105 and 107 both simultaneously started to transmit a packet to the terminal 109. Both packets are allowed to be transmitted via the space division switch 101 to the terminal 109 through the Hub 102.3. However, the space division switch 101 detects a collision and generate a jam signal as illustrated in FIG. 4.

The space division switch 101 is non-blocking. This allows two terminals, each being coupled to a different Hub, to be simultaneously transmitting via the space division switch 101 to two destination terminals each being coupled to other Hubs. For example, the terminal 105 can be transmitting to the terminal 110 simultaneously with the transmission of the terminal 108 to the terminal 116. In addition, a terminal can transmit to all other terminals utilizing the broadcast capabilities of the space division switch 101.

Figure 2:
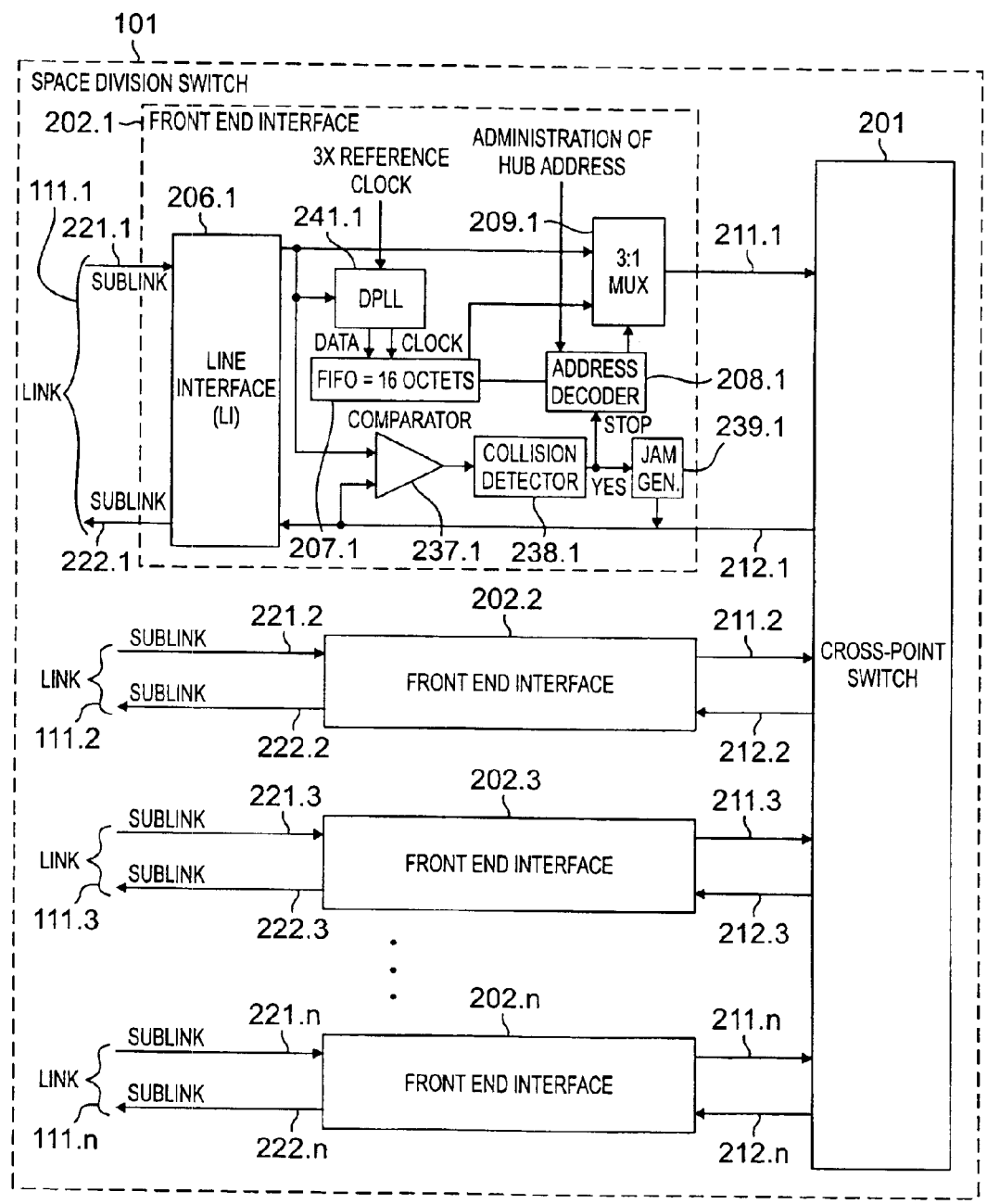
FIG. 2 shows the space division switch illustrated in FIG. 1 in further detail, in accordance with the present invention.

Referring to FIG. 2, there is shown the space division switch 101 illustrated in FIG. 1 in further detail, in accordance with the present invention. The space division switch 101 comprises a cross-point switch 201 and n front end interfaces 202.1, 202.2, 202.3, . . . , and 202.n that are coupled to the cross-point switch 201. Each of the links 111.1, 111.2, . . . , or 111.n comprises a pair of sublinks, one being a transmit sublink 221.1, 221.2, . . . , or 221.n and other being a receive sublink 222.1, 222.1, . . . , or 222.n. Each of the sublink pairs is coupled to a respective front end interface 202.1, 202.2, . . . , or 202.n. For each Hub x, the transmit sublink 221.x is utilized to transmit data from a Hub 102.x to the space division switch 101, and the receive sublink 222.x is utilized to receive data from the space division switch 101 to a Hub 102.x. The cross-point switch 201 receives n inputs (i.e. n port inputs) and switches the n inputs to n outputs (i.e. n port outputs). The n port inputs to the cross-point switch 201 are links 211.1, 211.2, . . . , and 211.n. Then n port outputs from the cross-point switch 201 are links 212.1, 212.2, . . . , and 212.n.

FIG. 2 shows the front end interface 202.1 in detail, which includes a line interface (LI) 206.1, a digital phase lock loop (DPLL) 241.1, a first-in-first-out buffer (FIFO) 207.1, an address decoder 208.1, a multiplexer (mux) 209.1, a comparator 237.1, a collision detector 238.1, and a jam generator 239.1.

All packets transmitted on the Hub 102.1 are communicated to the line interface (LI) 206.1 via the sublink 221.1. The information received by the line interface (LI) 206.1 is transmitted to the mux 209.1 and digital phase lock loop (DPLL) 241.1. The DPLL 241.1 recovers the clock and data from the information received from the line interface (LI) 206.1 and transmits the clock and data to the FIFO 207.1.

As will be discussed further below, the mux 209.1 has three modes of operation corresponding to its three inputs. In one mode of operation, the default mode, the mux 209.1 selects the input being directly received from the line interface 206.1. This mode allows other front end interfaces 202.x to monitor traffic on the hub 102.1 as necessary to determine whether the hub 102.1 is idle. In a second mode of operation, the mux 209.1 selects the input from the address decoder 208.1 to transmit address and control information to the cross point switch 201 for use by the control circuits located therein. In the third mode of operation, the mux 209.1 selects the input from the FIFO 207.1 to transmit a packet from the hub 102.1 to a destination hub via the cross point switch.

In general, in the first mode of operation the mux 209.1 remains in its default mode receives input from the line interface (LI) 206.1. In the default state, the FIFO 207.1 also receives the data from the line interface 206.1 so that the data can be monitored for incoming packets. The FIFO 207.1 has a capacity of 16 bytes so that it can delay the transmit packet a sufficient amount of time to allow the collision determination to be made. As can be seen from FIG. 3, the FIFO 207.1 can buffer the fields 301 to 303 (for a total of fourteen bytes) plus the first and second byte of the field 304 (source address field). The first and second byte of the source address field 304 are not processed, but merely providing a timing delay to allow the collision determination to be made.

The address decoder 208.1 monitors the destination address of every packet as it is buffered in the FIFO 207.1 to determine whether the packet is destined for another Hub other than the Hub 102.1. To this end, the address decoder 208.1 receives address information via the link 118.1 from the administration computer 119. The address decoder 208.1 stores the address information in a table so that it may be used when needed.

Considering the example in which the terminal 105 is attempting to transmit a packet to the terminal 109. When the address decoder 208.1 determines that the destination address field from an incoming packet designates that the packet is going to the terminal 109 via the Hub 102.3, the address decoder 208.1 signals the collision detector 238.1. The address decoder 208.1 then transmits an address and control information via the mux 209.1 and the link 211.1 (or port (1) input) to the cross point switch 201 to establish a unilateral (reverse) path from the Hub 102.3. To this end, the mux 209.1 operates in its second mode. The mux 209.1 in its second mode transmits the address and control information in a manner that is distinguishable from ordinary Ethernet data. In the example, described herein, the mux 209.1 transmits address and control information to the cross point switch 201 using a higher voltage bias level. As a result, the control circuitry within the cross point switch 201 can distinguish local address and control information (upon which it may act) from Ethernet data to be transmitted (which it should ignore).

In any event, the cross point switch 201 establishes the reverse unilateral path. The unilateral path includes the sublink 221.3, front end interface 202.3, link 211.3, cross point switch 201 and link 212.1. The collision detector 238.1, using the comparator 237.1, monitors this unilateral path to determine whether the Hub 102.3 is idle. Details regarding the operations of the cross point switch 201 that establish the unilateral path from the Hub 102.3 are provided below in connection with FIGS. 6, 7 and 8.

If the Hub 102.3 is idle, then the collision detector 238.1 enables the mux 209.1 so that the output of the FIFO 207.1 can be transmitted via the link 211.1, cross-point switch 201, link 212.3, and link 222.3 to the Hub 102.3. To this end, upon detecting that there is no activity in the Hub 102.3, the address decoder 208.1 establishes via the mux 209.1 a unilateral (forward) path via the cross-point switch 201 to allow the transmission of data from the link 211.1 to the link 212.3. To transmit the packet, the mux 209.1 reduces its output voltage level and transmits the packet data from the FIFO 207.1 over the link 211.1. Details regarding the operations of the cross point switch 201 that establish the unilateral path to the Hub 102.3 are provided below in connection with FIGS. 6, 7 and 8.

If, however, the Hub 102.3 is not idle when the terminal 105 attempts to transmit a packet to it, the collision detector 238.1 detects the non-idle condition and does not establish the path from the link 211.1 to the link 212.3 via the cross-point switch 201. The collision detector 238.1 also activates the jam generator 239.1 so that the terminal 105 can detect a collision. Then, the collision detector 238.1, using the address decoder 208.1, causes the cross point switch 201 to drop the link 211.3 to the link 212.1 connection. (See FIGS. 6, 7 and 8).

During the transmission of a packet from the terminal 105 to the terminal 109, the terminal 110 may also commence transmitting a packet. In this situation, the terminals 105 and 110 detect a collision and transmit the jam signal as illustrated in FIG. 4 to the Hub 102.3. The terminals 105 and 110 recognize the collision and will attempt transmission of the packet at a later point in time.

The Hubs 102.2, . . . , and 102.n are coupled to the cross-point switch 201 through the front end interfaces 202.2, ..., and 202.n, respectively. The structure and function of the front end interfaces 202.2, ..., or 202.n are the same as that of the front end interface 202.1.

Referring to FIG. 3, there is shown an Ethernet packet 300, which includes a preamble field 301, an SFD field 302, a destination address field 303, a source address field 304, a length field 306, a data field 307 and an FCS field 308. Referring to FIG. 4, there is shown a collision jam signal (or jam packet) having a unique bit pattern for indicating collusion conditions during Ethernet packet transmissions.

Before explaining the present invention in further detail, it is helpful to summarize the process of transmitting a packet from a source port (i) to Hub (j) through a destination port (j) utilizing the space division switch 101 illustrated in FIGS. 1 and 2. The transmission process includes the following steps:

(1) establishing a first unilateral path from the destination port (j) to the source port (i);

(2) detecting, at the source port (i) via the first unilateral path, whether Hub (j) is idle;

(3) suspending the transmission and disconnecting the first unilateral path, if Hub (j) is not idle;

(4) establishing a second unilateral path from the source port (i) to the destination port (j), if Hub (j) is idle;

(5) transmitting the packet from the source port (i) first to the destination port (j), then to Hub (j), via the second unilateral path; and (6) disconnecting both the first and second unilateral paths when the transmission operation is completed.

It will be appreciated from the above summary that the operation of transmitting a packet from a source port (i) to a destination port (j) involves a pair of cross points: a cross point (i, j) which is utilized to establish a unilateral path from the source port (i) to the destination port (j), and a complementary cross point (j, i) which is utilized to establish a unilateral path from the destination port (j) to the source port (i). Accordingly, the present invention uses two cross-point switch matrixes for establishing these two unilateral paths, respectively. Moreover, in accordance with one embodiment of the present invention, a single control circuit controls each cross point (i, j) and its complementary cross point (j, i).

Figure 5:
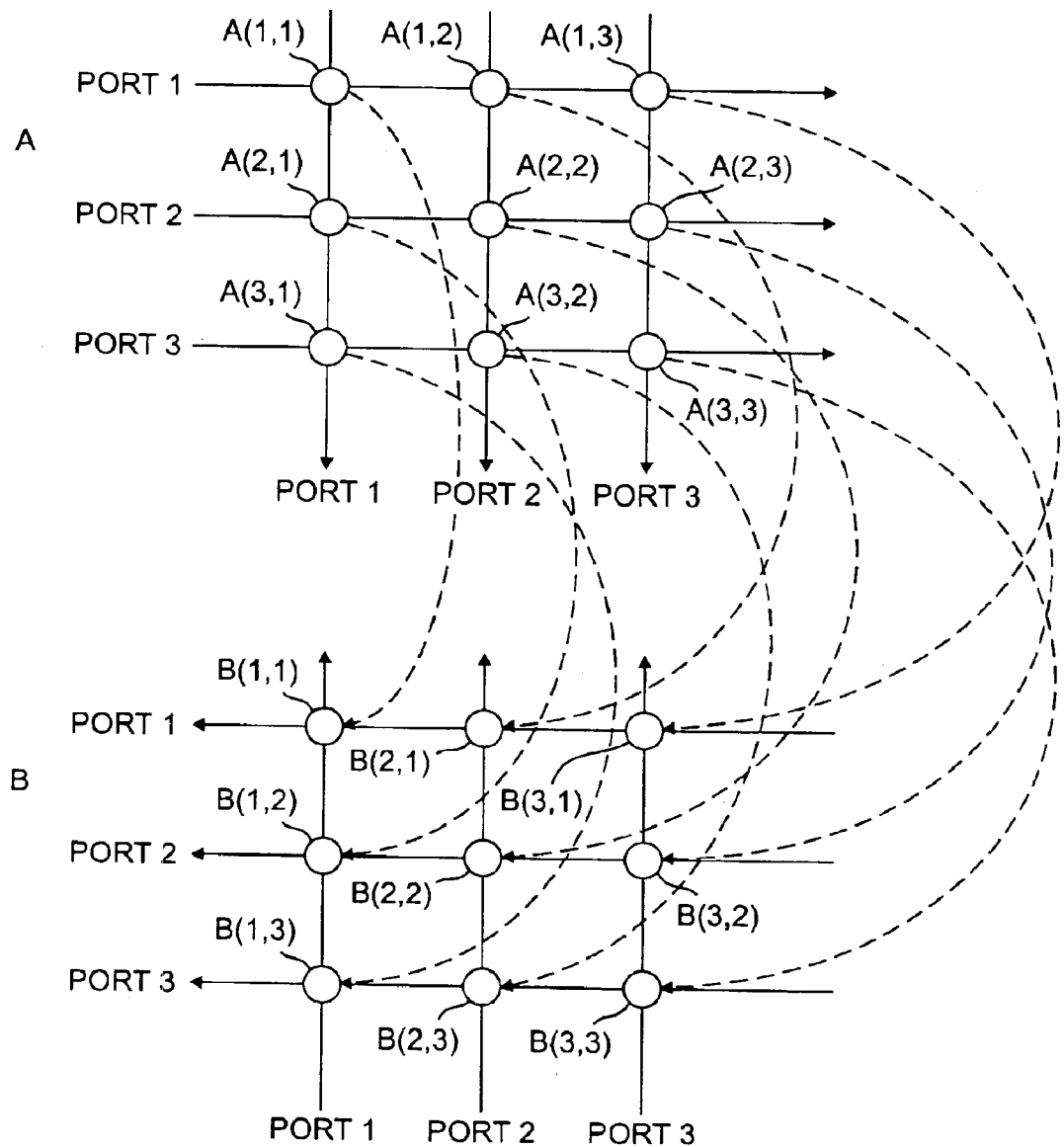
FIG. 5 shows a source to destination switch matrix and a complementary destination to source switch matrix which implement the connectivity between three port inputs and three port outputs in accordance with the present invention.

Referring to FIG. 5, there are shown two switch matrixes A and B which are used to illustrate the principle to implement the connectivity between three port transmit lines 211.1, 211.2 and 211.3 and three port receive lines 212.1, 212.2 and 212.3, in accordance with the present invention. It will be noted that actual matrices A and B would be configured to implement connectivity between substantially more than three ports, even within a single integrated circuit. However, FIGS. 5 through 8 show exemplary matrices providing connectivity between three ports to clarify explanation of the principles of the invention. Those of ordinary skill in the art may readily implement the invention to a single integrated circuit providing connectivity between up to 128 ports, or a matrix of integrated circuits providing connectivity between several hundred ports as discussed below in connection with FIG. 9.

In FIG. 5, the matrix A is the source to destination matrix, while matrix B is the destination to source matrix. Each port transmit line 211.i forms a row in the matrix A and also forms a column in the matrix B. Each port receive line 212.j forms a column in the matrix A and a row in the matrix B.

The nine cross points in matrix A are denoted as:

A(1, 1), A(1, 2), A(1, 3)
A(2, 1), A(2, 2), A(2, 3)
A(3, 1), A(3, 2), A(3, 3)

Each cross point A(i, j) (i, or j=1, 2, 3, ..., n) is able to establish a unilateral path from a source port (i) to a destination port (j).

The nine cross points in matrix B are denoted as:

B(1, 1), B(2, 1), B(3, 1)
B(1, 2), B(2, 2), B(3, 2)
B(1, 3), B(2, 3), B(3, 3)

Each cross point B(j, i) (j, or i=1, 2, 3, ..., n) is able to establish a unilateral path from a destination port (j) to a source port (i).

Each cross point A(i, j) in the matrix A is paired with a corresponding complementary cross point B(j, i) in the matrix B as illustrated by the dot line between these two cross points (i, or j=1, 2, 3, ..., n).

When a packet needs to be transmitted from a source port (i) to Hub (j) which is coupled to a destination port (j), the cross point B(j, i) in the matrix B is activated to establish a first unilateral path from the destination port (j) to the source port (i), so that the activity of Hub (j) can be monitored via the first unilateral path at the source port (i). If Hub (j) is idle, the cross point A(i, j) in the matrix A is then activated to establish a second unilateral path from the source port (i) to the destination port (j), so that a packet can be transmitted from the source port (i) to Hub (j) via the second unilateral path. After the transmission of the packet is completed, the cross points A(i, j) and B(j, i) are deactivated to release the first and second unilateral paths.

Figure 6:
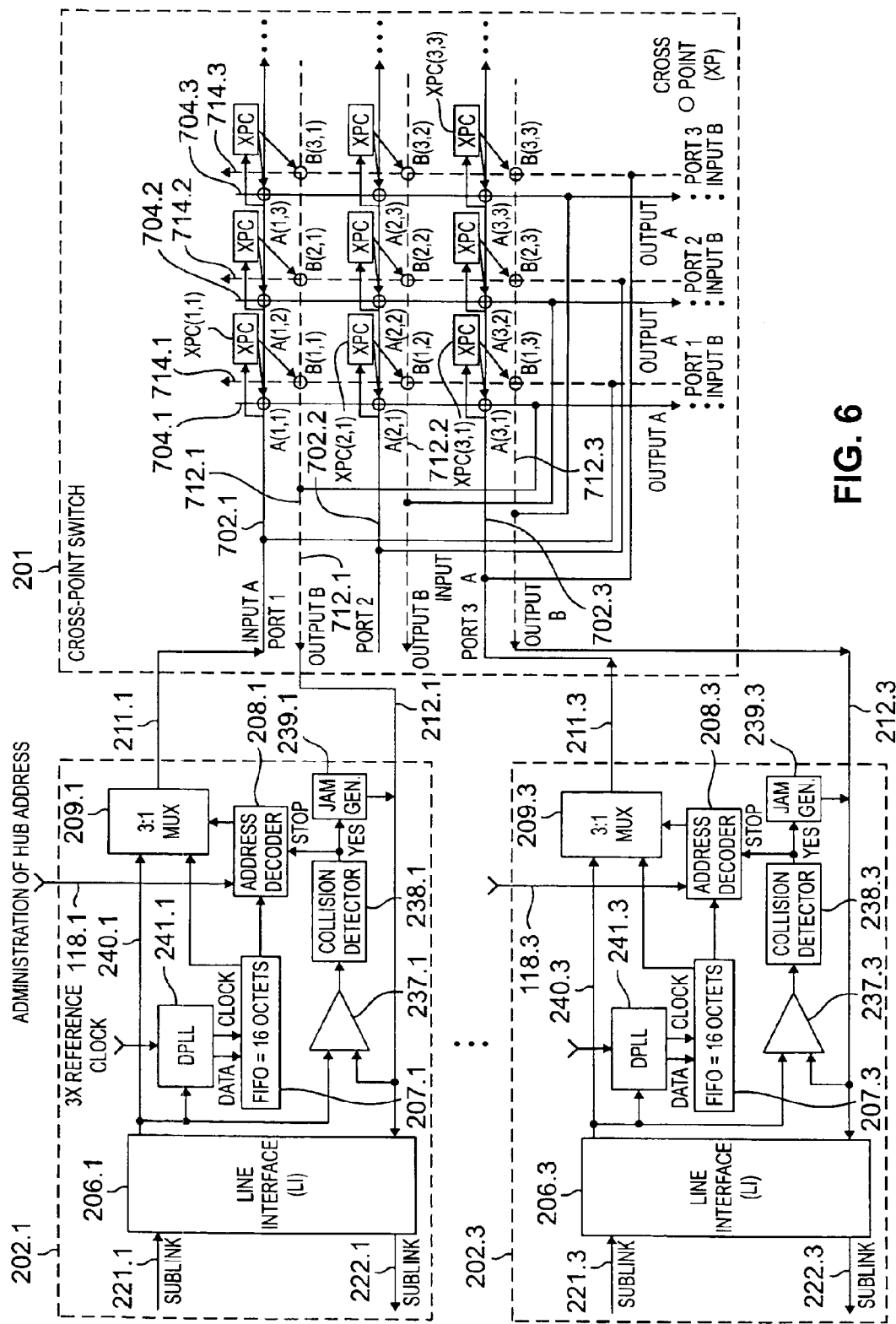
FIG. 6 shows the cross-point switch 201 illustrated in FIG. 2 in further detail, in accordance with the present invention.

Referring to FIG. 6, there is shown the cross-point switch 201 illustrated in FIG. 2 in further detail, using the principle illustrated in FIG. 5, in accordance with the present invention. The cross-point switch 210 includes two switch cross point matrices (A and B). The matrix A delineated by solid lines is the source to destination matrix, and the matrix delineated by the dot lines is the destination to source matrix. Each of the two matrixes has n rows and n columns of cross points. However, to facilitate description of the present invention, FIG. 6 specifically shows three rows and three columns for each matrix.

The matrix A includes three row connections 702.1, 702.2, 702.3 and three column connections 704.1, 704.2, 704.3. The three row connections 702.1, 702.2, 702.3 are coupled, respectively, to the port transmit lines 211.1, 211.2 and 211.3. The three column connections 704.1, 704.2, 704.3 are coupled, respectively, to the port receive lines 212.1, 212.2, 212.3.

In other words, the transmit line 211.i of port (i) in the matrix A is coupled to the row connection 702.i, and the receive line 212.i of port (i) in the matrix A is coupled to the column connection 704.i (i=1, 2, 3, ..., n). The cross connections between the three row connections and three column connections forms a matrix of 3×3 cross points, which is denoted as:

A(1, 1), A(1, 2), A(1, 3)
A(2, 1), A(2, 2), A(2, 3)
A(3, 1), A(3, 2), A(3, 3)

Each cross point A(i, j) in the matrix A is able to establish a unilateral path from a source port (i) to a destination port (j) (i, or j=1, 2, 3, ..., n).

The matrix B includes three row connections 712.1, 712.2, 712.3 and three column connections 714.1, 714.2, 714.3. The three row connections 712.1, 712.2, 712.3 are coupled, respectively, to the port receive lines 212.1, 212.2 and 212.3. The three column connections 714.1, 714.2, 714.3 are coupled, respectively, to the port transmit lines 211.1, 211.2, 211.3.

In other words, the receive line 212.i of port (i) in the matrix B is coupled to the row connection 712.i, and the transmit line 211.i of port (i) in the matrix B is coupled to the column connection 714.i (i=1, 2, 3, . . . , n). The cross connections between the three row connections and three column connections forms a matrix of 3×3 cross points, which is denoted as:

B(1, 1), B(2, 1), B(3, 1)
B(1, 2), B(2, 2), B(3, 2)
B(1, 3), B(2, 3), B(3, 3)

Each cross point B(j, i) in the matrix B is able to establish a unilateral path from a destination port (j) to a source port (i) (j, or i=1, 2, 3, . . . , n).

It will be appreciated from the above discussion that each port transmit line 211.i is coupled to a row connection 702.i of matrix A and a column connection 714.i of matrix B. Likewise, each port receive line 212.i is coupled to a row connection 712.i of matrix A and a column connection 704.i of matrix B.

The cross-point switch 201 further includes a matrix of (3×3) cross point control circuits (XPCs) that are denoted as:

XPC(1, 1), XPC(1, 2), XPC(1, 3)
XPC(2, 1), XPC(2, 2), XPC(2, 3)
XPC(3, 1), XPC(3, 2), XPC(3, 3)

Each XPC(i, j) is coupled A(i, j) and B(j, i) so that the XPC(i, j) can individually control (activate or deactivate) both the cross point A(i, j) in the matrix A and its complementary cross point B(j, i) in the matrix B. Moreover, each XPC(i, j) in the ith row is coupled to receive control/address signals from each port (i) through the port transmit line 211.i and the row connection 702.i. Thus, for example, the XPC(1, 1), the XPC(1, 2), and the XPC(1, 3) are all coupled to receive information via the port transmit line 211.1.

As illustrated in FIG. 2, each of n front end interfaces 202 is coupled to the cross-point switch 201. FIG. 6 shows the connection details from the front end interfaces 202.1 and 202.3 to the cross-point switch 201. Specifically, in the front end interface 202.1, the port transmit line or link 211.1 is coupled to the line interface 206.1 via the mux 209.1. The port receive line or link 212.1 is coupled to, among other things, the line interface (LI) 206.1. In the front end interface 202.3, the port transmit line 211.3 is coupled to the line interface 206.3 via the mux 209.3 and the port receive line 212.3 is also coupled to the line interface (LI) 206.3.

By the same token, all other front end interfaces are coupled to the cross-point switch 201 in the same way as that of the front end interface 202.1 or 202.3. Specifically, the port transmit line 211.i is coupled to the line interface 206.i via the mux 209.i and the port receive line 212.i is coupled to the line interface (LI) 206.i.

Figure 7:
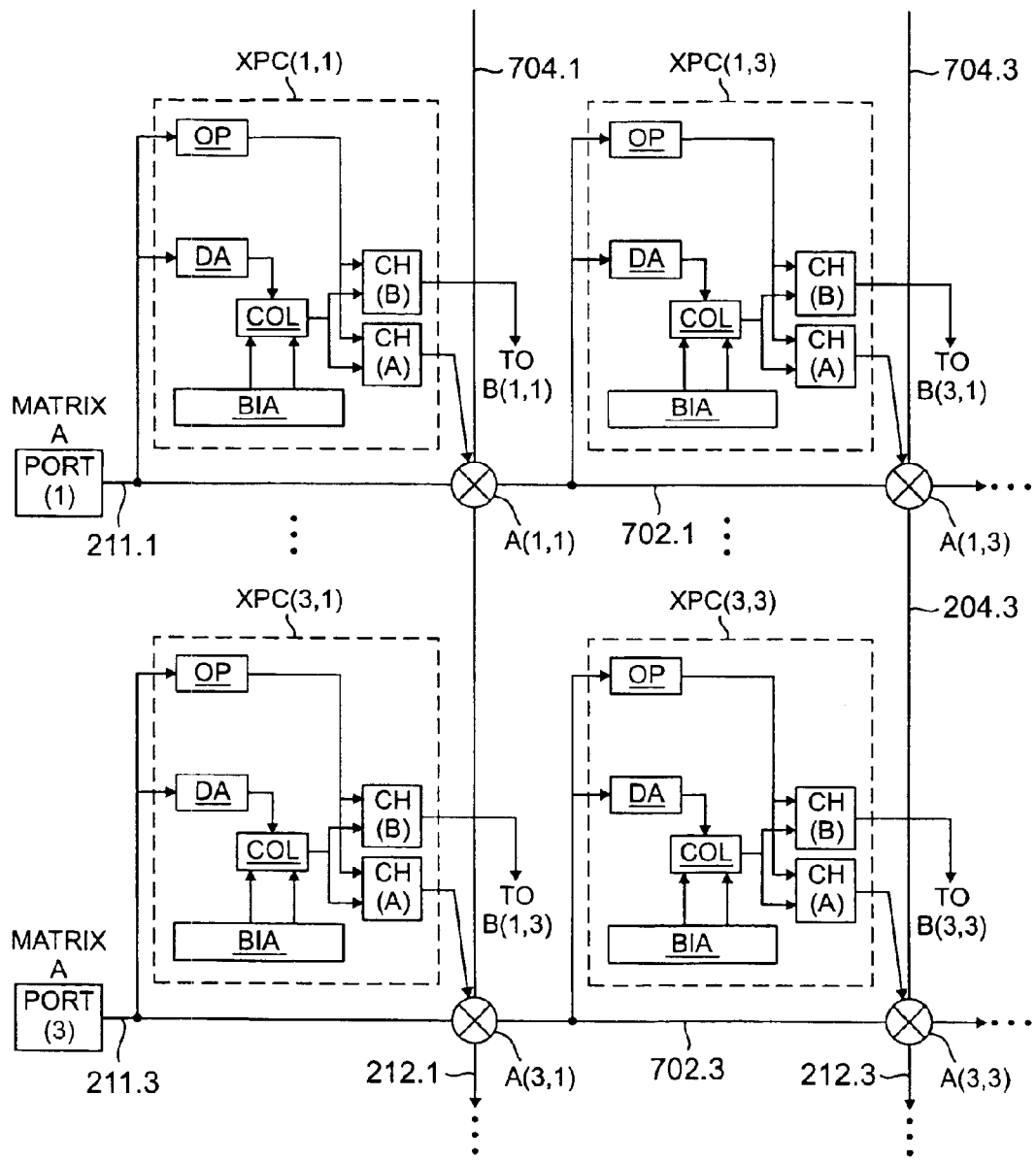
FIG. 7 shows further details of the control circuits as illustrated in FIG. 6, in accordance with the present invention.

Referring to FIG. 7, there are shown further details of the control circuits XPCs illustrated in FIG. 6, in accordance with the present invention. Specifically, FIG. 7 shows the first and third row connections 702.1 and 702.3 and first and third column connections 704.1 and 704.3 in the matrix A. There are shown two control circuits in the first row connections XPC(1, 1) and XPC(1, 3); and two control circuits in the third row XPC(3, 1) and XPC(3, 3). The matrix A includes four cross points A(1, 1), A(1, 3), A(3, 1) and A(3, 3). Each of four control circuits XPC(1, 1), XPC(1, 3), XPC(3, 1) and XPC(3, 3) is coupled to and controls a respective cross point A(1, 1), A(1, 3), A(3, 1) or A(3, 3) and the matrix A. Each of four control circuits XPC(1, 1), XPC(1, 3), XPC(3, 1) or XPC(3, 3) also is coupled to, and controls a respective cross point B(1, 1), B(3, 1), B(1, 3) and B(3, 3) in the matrix B, which are not shown in FIG. 7.

In each of the control circuits illustrated in FIG. 7, the DA block is a register for storing the local destination address which is received during operation via the port transmit line 211.i and the row connection 702.i. The built-in address block BIA is non-volatile memory for storing the built-in destination address for that control circuit. For example, for XPC(i, j), its built-in address is DAj. The OP block is the register for storing the CONNECT_A, CONNECT_B or DISCONNECT operation request, also received via the port transmit line 211.i and the row connection 702.i. The COL block is configured to compare the destination address in the DA register with the built-in address stored in block BIA. When the destination address in the DA register matches the built-in address in block BIA, the COL block generates a control signal to the CH(A) and CH(B) blocks. Under the control of the OP block and COL block, each of the CH(A) and CH(B) blocks controls (activate or deactivate) a corresponding cross point in the matrix A and a corresponding complementary cross point in the matrix B, respectively.

Figure 8:
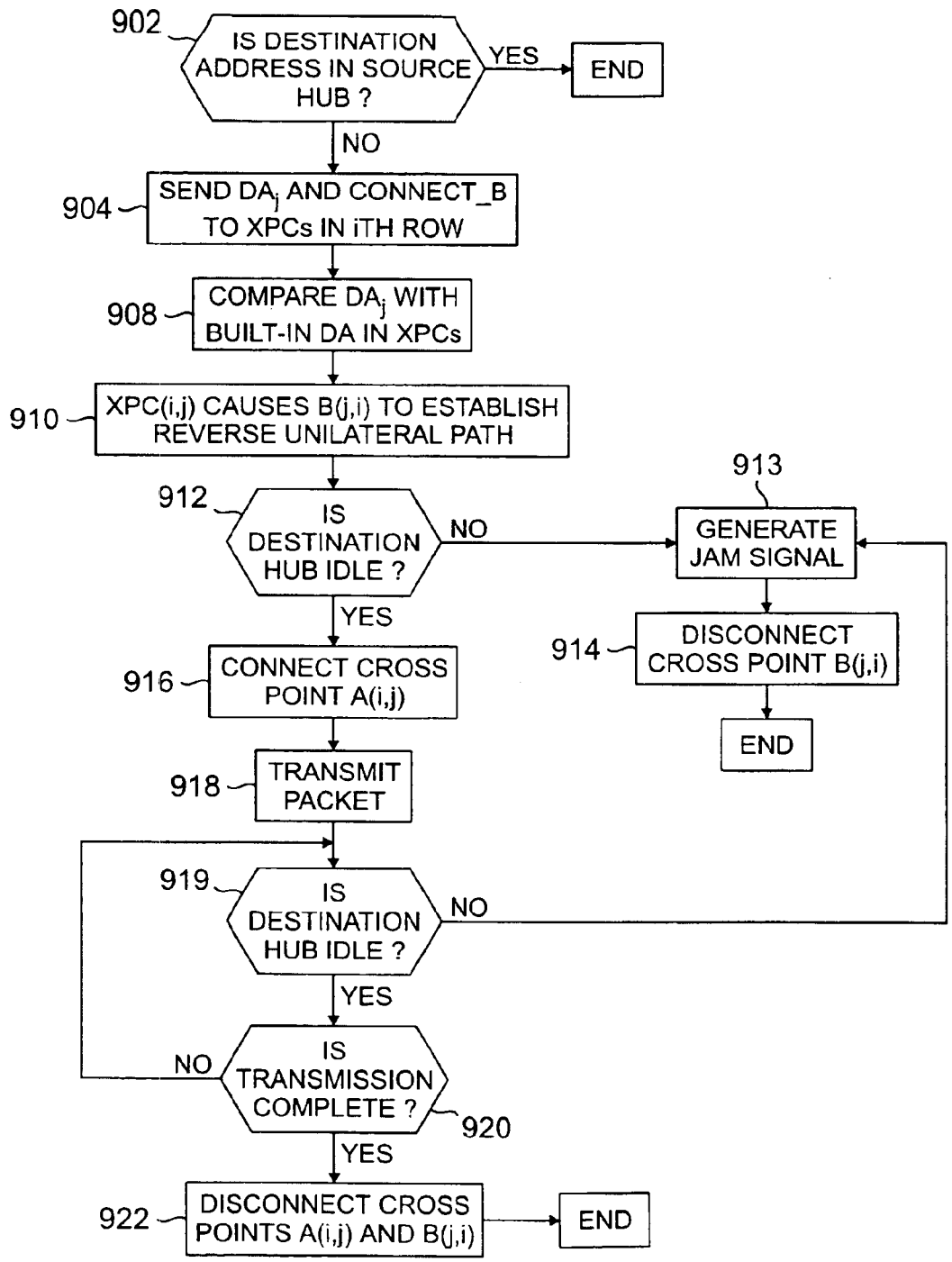
FIG. 8 is a flowchart illustrating a process of transmitting a packet from a source port (i) to a destination port (j) in reference to the structures illustrated in FIGS. 1, 2, 6, and 7, in accordance with the present invention.

Referring to FIG. 8, there is shown a flowchart illustrating the process of transmitting a packet from a Hub (i) that is coupled to a source port (i) to a Hub (j) that is coupled to a destination port (j) (i or j=1, 2, . . . , n), in reference to the structures illustrated in FIGS. 1, 2, 6 and 7, in accordance with the present invention. In describing the process illustrated in FIG. 8, an exemplary operation will be described in which the source port (i) is port (1) and the destination port (j) is port (3). To this end, it is presumed that the front end interface 202.1 has begun receiving a packet from the Hub (1) and is processing the address information. The general operation of the front end interface 202.1 is described further above.

In step 902, the address decoder 208.i monitor the destination address of the packet to determine whether the destination address is located in the source Hub (i). If the destination address is in the source Hub (i), then the cross point switch 201 is not needed and the operation ends. If the destination address is not in the Hub (i), then step 904 is executed.

In step 904, the address decoder 208.i transmits via the 3:1 mux 209.i, the destination address=DAj and operation= $CONNECT_{13}$ B to the port transmit line 211.i. In this example, the mux 209.1 sends the destination address (DA3) over the port transmit line 211.1 to control circuits XPC(1, 1), XPC(1, 2), XPC(1, 3), . . . , XPC (1, n). Each of such control circuits in the ith row receives and stores the DAj information in its DA register and the CONNECT_B information within its OP register. Thus, in the example described herein, the control circuits XPC(1, 1), XPC(1, 2), XPC(1, 3), . . . , XPC (1, n) load their the DA registers with DA3 indicating the destination port is port (3) and loads their OP registers with CONNECT_B.

In step 908, the COL block in each of the control circuits in the ith row compares its built-in DA address in the BIA block with the destination address received in their DA registers in step 904. In other words, the COL block of each XPC(i, j) determines whether the received information includes DAj. If the built-in address does not match the received destination address, the control circuits ignores this message. If the built in address matches the destination address, the COL block generates a control signal to its respective CH(A) and CH(B) blocks.

Thus, in the exemplary embodiment described herein, the COL block in XPC(1, 3) generates a control signal to its respective CH(A) and CH(B) blocks.

In step 910, the CH(B) block in the matched control circuit XPC(i, j) performs the operation stored in its OP register, CONNECT_B. Accordingly, the CH(B) block of the control circuit XPC(i, j) activates the cross point B(j, i) to establish a first (reverse) unilateral path from the destination port (j) to the source port (i). In this example, the CH(B) block of the control circuit XPC(1, 3) activates the cross point B(3, 1). The first unilateral path includes the link 211.3, the cross-point switch 201 and the link 212.1. It is noted that the link 211.3 receives signals on the Hub (3) via the mux 209.3 from the direct link 240.3, which bypasses the FIFO 241.1.

In step 912, the comparator 237.i and collision detector 238.i monitor, via the first unilateral path, whether Hub (j) is idle. If Hub (j) is not idle, the operation proceeds to step 913. If Hub (j) is idle, the operation proceeds to step 916.

In step 913 (Hub (j) not idle), the jam generator 239.i generates a collision jam signal as illustrated in FIG. 4. The collision jam signal is provided back to the Hub (i). In accordance with the present invention, the collision jam signal is generated prior to completion of the transmission of the packet from the Hub (i) to the FIFO 207.i. As a result, the collision jam signal is provided in accordance with the physical layer switching protocol. In particular, as discussed above, in the physical layer, the source of the packet must detect a collision before it is done transmitting the packet.

In step 914 sends, the address decoder 208.i sends, via the mux 209.i, DAj and operation=DISCONNECT_B to the control circuits XPC(i, 1), XPC(i, 2), XPC(i, 3), . . . , and XPC(i, n). Only XPC(i, j) acts on this message. Specifically, the CH(B) in the control circuit XPC(i, j) deactivates the cross point B(j, i) in the matrix B to release the first unilateral path. Thus, in the exemplary operation discussed herein, the XPC(1, 3) receives the DISCONNECT_B information and deactivates the cross point B(3, 1) responsive thereto. The operation then ends.

In step 916 (Hub (j) idle), the CH(A) block in the control circuit XPC(i, j) activates the cross point A(i, j) (A(1, 3) in this example) to establish a second unilateral path from the source port (i) to the destination port (j). To this end, the address decoder 208.i preferably sends DAj and operation=CONNECT_A to all of the XPCs in the port transmit line 211.i. The control circuit XPC(i, j) then performs the received operation, CONNECT_A. Thus, in this example, the control circuit XPC(1, 3) causes the cross point A(1, 3) to be activated to establish the second (forward) unilateral path that includes the link 211.1, the cross-point switch 201 and the link 212.3.

In step 918, the address decoder 208.i transmits, via the 3:1 mux 209.i, the packet stored in the FIFO 207.i through the second unilateral path and the line interface 206.j to the Hub (j). Thus, in the exemplary operation described herein, the address decoder 208.1 transmits the packet received into the FIFO 207.1 from the Hub (1) to the port transmit link 211.1. The packet propagates through the port receive link 212.3 via cross point A(1, 3).

While the packet is being transmitted, the collision detector 238.1 in step 919 continues to monitor whether the Hub (3) remains idle for the transmission of the entire packet. If the destination Hub (3) does not remain idle, the operation proceeds to step 913 to generate a collision jam signal and end the transmission. Otherwise, the operation continues through step 920.

Step 920 tests for completion of the packet transmission. If the transmission is not done, the operation is looped back to step 919 to continue collision monitoring during packet transmission. If, however, the transmission is completed, the operation proceeds to step 922.

In step 922, the address decoder 208.i sends to the control circuits in the ith row the following information: operation=DISCONNECT_AB and DAj. However, only the control circuit XPC(i, j) acts on this message. Specifically, the CH(B) in the control circuit XPC(i, j) deactivates the cross point B(j, i) (B(3, 1) in this example) in the matrix B to release the first unilateral path. At the same time, the CH(A) in the control circuit XPC(i, j) deactivates the cross point A(i, j) (A(1, 3) in this example) in the matrix A to release the second unilateral path. The operation then ends.

Thus, the present invention allows for the control of both cross points necessary to perform a physical layer switching operation through communication to only a single control circuit. Moreover, in the preferred embodiment described above, communication of information to the cross points may be accomplished through the same port transmit link that carries the transmitted packet.

It will be appreciated that the form of the control circuits may vary. Those of ordinary skill in the art may readily devise other control circuits that receive address and control information and control complementary cross points to establish reverse and forward path communication links in the sequence described generally above. Such other control circuits may require somewhat different control signals. For example, one other control circuit may include some state machine functionality that eliminates the need for separate CONNECT_B and CONNECT_A operations. Such a circuit may only receive CONNECT information (and DAj information) and determine what operation to execute based on its current state. Likewise, other control circuits may merely require a DISCONNECT operation instead of separate DISCONNECT_B and DISCONNECT_AB.

It will be appreciated that one advantage of the reduction of control circuitry connections in the present invention is that the cross point switch 101 of FIG. 1 may readily be expanded to include hundreds of cross points or more. To this end, it is noted that the dual cross point control circuitry and the complementary cross point matrix circuitry is readily implemented on multiple cross point integrated circuits.

Figure 9:
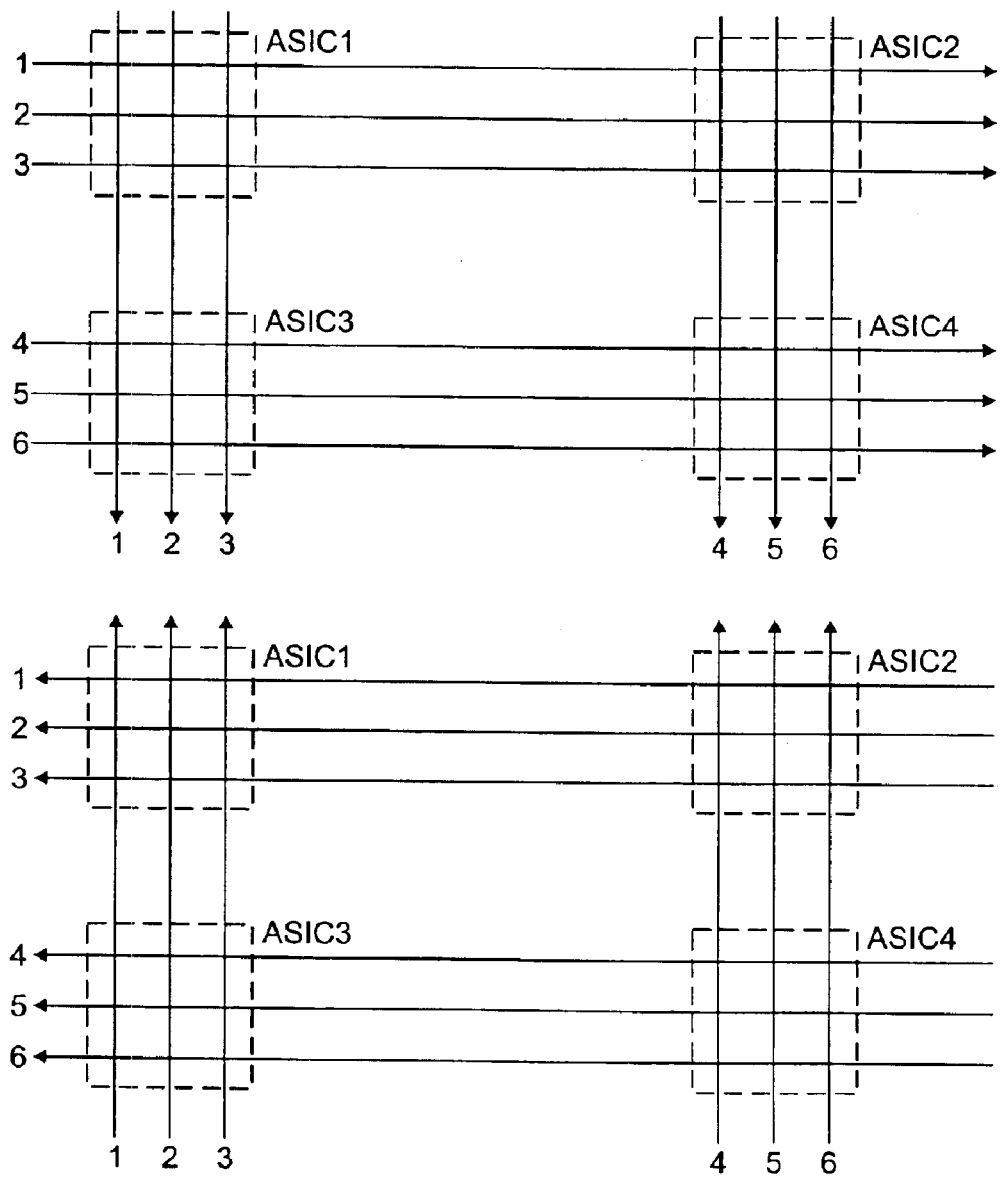
FIG. 9 shows a source to destination switch matrix and a destination to source switch matrix which are able to perform the connectivity between nine port inputs and nine port outputs, in accordance with the present invention.

Referring to FIG. 9, there is shown a source to destination matrix A and a destination to source matrix B, with each of the matrixes having six rows and six columns, in accordance with the present invention. FIG. 9 illustrates that the principle described in connection with FIG. 5 can be readily extended to a multiple integrated circuits that contain a portion of each of matrices A and B to expand the switch size. Note that each integrated circuit in FIG. 9 is comprised both the source to destination matrix and the destination to source matrix.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

We claim:

1. In a switching system having a plurality of ports with each of the ports being coupled to a local area network via a Hub, the connectivity between the inputs and outputs of the plurality of ports forming first and second matrixes of cross points, each cross point in the first matrix establishing a unilateral communication path from a source port to a destination port, each cross point in the second matrix providing a complementary connection from the destination port to the source port, a method of establishing a transmission operation from a first Hub coupled to a first source port to a second Hub coupled to a first destination port, the method comprising the steps of:

a) activating a first cross point in the second matrix to establish a first unilateral path from the first destination port to the first source port;

b) detecting, via the first unilateral path connection from the first destination port to the first source port, whether the second Hub is idle; and c) generating a collision signal, at the first source port when the second Hub is not idle.

2. The method of claim 1, further comprising the step of:

d) activating a second cross point to establish a second unilateral path connection from the first source port to the first destination port when the second Hub is idle.

3. The method of claim 2, further comprising the step of:

e) transmitting the packet from the first source port to the second Hub through the second unilateral path.

4. The method of claim 1 wherein step a) further comprises employing a control circuit to activate the first cross point in the second matrix.

5. The method of claim 2 wherein step a) further comprises employing a control circuit to activate the first cross point in the second matrix; an step d) further comprises employing the control circuit to activate the second cross point in the first matrix.

6. The method of claim 4, wherein step a) further comprises:

providing to the control circuit a destination address for the first destination port;

comparing the provided destination address with a built-in destination address within the control circuit; and activating the first cross point when the provided destination address matches the built-in destination address.

7. In a switching system having a plurality of ports with each of the ports being coupled to a local area network via a Hub, an arrangement for establishing connectivity between the inputs and outputs of the plurality of ports, comprising:

a) a first matrix of cross points operable to connect select pairs of the plurality of ports;

b) a second matrix of cross points operable to connect select pairs of the plurality of ports;

c) a control circuit associated with a first cross point of the first matrix and a complementary cross point of the second matrix, the first cross point operable to establish a first unilateral path from a first source port to a first destination port, the complementary cross point operable to establish a second unilateral path from the first destination port to the first source port.

8. The arrangement of claim 7 further comprising a port interface circuit coupled to the first source port, the port interface operable to:

cause the control circuit to cause the complentary cross point to establish the second unilateral path from the first destination port to the first source port; and monitor the first destination port to determine if a first Hub coupled to the first destination port is idle when the complementary cross point has established the second unilateral path from the first destination port to the first source port.

9. The arrangement of claim 8, wherein the port interface circuit is further operable to cause the control circuit to cause the first cross point to establish the first unilateral path from the first source port to the first destination port if the first Hub is determined to be idle.

10. The arrangement of claim 7 wherein each of the plurality of ports includes a port transmit line defining a row in the first matrix and a port receive line defining a column in the first matrix.

11. The arrangement of claim 7 wherein:

the second matrix comprises a number of row lines and a same number of column lines;

each second matrix row line is coupled to a first matrix column line; an each second matrix column is coupled to a first matrix row line.

12. The arrangement of claim 10 wherein the control circuit is operably coupled to the port transmit line of the first source port.

13. The arrangement of claim 12 wherein the control circuit is operable to receive address information over the port transmit line of the first source port, and wherein the control circuit is operable to cause the second cross point to establish the second unilateral path from the first destination port to the first source port responsive to receiving the address information.

14. The arrangement of claim 12 wherein the control circuit is further operable to receive operational information over the port transmit line of the first source port, and wherein the control circuit is operable to cause the complentary cross point to establish the second unilateral path from the first destination port to the source port responsive to receiving the address information and the operational information.

15. The arrangement of claim 13 wherein the control circuit is further operable to receive additional information over the port transmit line of the first source port, and wherein the control circuit is operable to cause the first cross point to establish the first unilateral path from the first source port to the first destination port responsive to receiving the additional information.

16. The arrangement of claim 15 wherein the additional information includes additional address information.

17. The arrangement of claim 16 wherein the additional information includes additional operational information.

18. In a switching system having n ports with each of the ports being coupled to a local area network via a Hub, a switching arrangement comprising:

a) a first matrix of cross points, each cross point selectively and connecting one of n port transmit lines to one of n port receive lines, thereby establishing a unilateral communication path from a source port to a destination port; and b) a plurality of cross point control circuits, each cross point control circuit operably coupled to controllably activate an associated cross point of the first matrix, the associated cross point connecting a select port transmit line and a select port receive line, the cross point control circuit further operably coupled to the select port transmit line to receive cross point control information therefrom, the cross point control circuit operable to activate the associated cross point responsive to cross point control information therefrom.

19. The switching arrangement of claim 18, further comprising a multiplexer having an output coupled to the select port transmit line, a first input connected to a source of cross point control information, and a second input connected to a source of packet data to be transmitted via the associated cross point.

20. The switching arrangement of claim 18, a first input connected to a source of cross point control information, and a second input connected to a source of packet data, and a third input connected to a source of delayed packet data.

* * * * *